(12) United States Patent
Alamillo

(10) Patent No.: US 8,057,142 B1
(45) Date of Patent: Nov. 15, 2011

(54) TIE DOWN BRACKET APPARATUS

(76) Inventor: Anthony J. Alamillo, Stockton, CA (US)

( * ) Notice: Subject to any disclaimer, the term of this patent is extended or adjusted under 35 U.S.C. 154(b) by 162 days.

(21) Appl. No.: 12/550,557

(22) Filed: Aug. 31, 2009

(51) Int. Cl.
*B61D 45/00* (2006.01)

(52) U.S. Cl. ........................................... 410/101

(58) Field of Classification Search ............... 410/101, 410/102, 106, 108, 109, 110, 113, 116; 24/265 CD, 24/115 K; 248/499
See application file for complete search history.

(56) References Cited

U.S. PATENT DOCUMENTS

| | | | |
|---|---|---|---|
| 3,351,356 A | 11/1967 | Clark et al. | |
| 3,367,286 A * | 2/1968 | Jantzen | 410/102 |
| 3,381,925 A * | 5/1968 | Nori Higuchi | 410/116 |
| 4,762,449 A | 8/1988 | St. Pierre et al. | |
| 4,812,093 A | 3/1989 | Millar, Jr. | |
| 5,326,203 A | 7/1994 | Cockrell | |
| D408,267 S * | 4/1999 | Egigian et al. | D8/354 |
| 6,350,089 B1 * | 2/2002 | Tekavec | 410/106 |
| D468,192 S | 1/2003 | Lee | |
| 6,969,219 B2 | 11/2005 | Speece et al. | |
| D565,935 S * | 4/2008 | Selby | D8/356 |
| 7,481,610 B1 | 1/2009 | Egigian | |

* cited by examiner

*Primary Examiner* — H Gutman
(74) *Attorney, Agent, or Firm* — Crossley Patent Law; Mark A. Crossley

(57) ABSTRACT

The tie down bracket apparatus is provided for attachment to any given surface. The apparatus is especially useful on vehicles that often carry loads. The elongated slot is long enough to accommodate both narrow and wide straps. The ears are sufficiently large to provide good surface contact with a given mounting surface. The downturned extensions importantly prevent abrasion of straps that are passed through the slot. The steps provide platform elevation that enables easy strap insertion.

3 Claims, 4 Drawing Sheets

180
TIE DOWN BRACKET APPARATUS

BACKGROUND OF THE INVENTION

Tie down straps are widely used to secure loads and the like on and within vehicles and also to other surfaces and objects. A problem exists in that no strong high quality brackets are currently made that particularly accommodate tie down straps. The present apparatus solves this problem.

FIELD OF THE INVENTION

The tie down bracket apparatus relates to tie down straps and more especially to a bracket apparatus that is mounted to any chosen surface, especially that of a vehicle, and provides an elevated elongated slot for tie down straps.

SUMMARY OF THE INVENTION

The general purpose of the tie down bracket apparatus, described subsequently in greater detail, is to provide a tie down bracket apparatus which has many novel features that result in an improved tie down bracket apparatus which is not anticipated, rendered obvious, suggested, or even implied by prior art, either alone or in combination thereof.

To attain this, the tie down bracket apparatus is provided for attachment to any given surface. The apparatus is especially useful on vehicles that often carry loads. The apparatus is about 5 inches long and 2 inches wide. The size is important in that the elongated slot is long enough to accommodate both narrow and wide straps. The slot is ideally at least 2 inches long. The ears are sufficiently large to provide good surface contact with a given mounting surface. The downturned extensions are important in that they prevent abrasion of straps that are passed through the slot. The steps provide platform elevation that enables easy strap insertion. Although not limited to particular sizes, the mount holes are ideally 11/64 inch diameter, and the fasteners 3/8 inch diameter.

Thus has been broadly outlined the more important features of the improved tie down bracket apparatus so that the detailed description thereof that follows may be better understood and in order that the present contribution to the art may be better appreciated.

An object of the tie down bracket apparatus is to positively anchor to an existing surface.

Another object of the tie down bracket apparatus is to especially accommodate tie down straps.

A further object of the tie down bracket apparatus is to accommodate more than one size of tie down strap.

An added object of the tie down bracket apparatus is to prevent strap abrasion.

And, an object of the tie down bracket apparatus is to provide for easy strap insertion.

These together with additional objects, features and advantages of the improved tie down bracket apparatus will be readily apparent to those of ordinary skill in the art upon reading the following detailed description of presently preferred, but nonetheless illustrative, embodiments of the improved tie down bracket apparatus when taken in conjunction with the accompanying drawings.

In this respect, before explaining the current embodiments of the improved tie down bracket apparatus in detail, it is to be understood that the tie down bracket apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved tie down bracket apparatus. It is therefore important that the claims be regarded as including such equivalent constructions insofar as they do not depart from the spirit and scope of the tie down bracket apparatus.

It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 4 thereof, the principles and concepts of the tie down bracket apparatus generally designated by the reference number 10 will be described.

Figure 1:
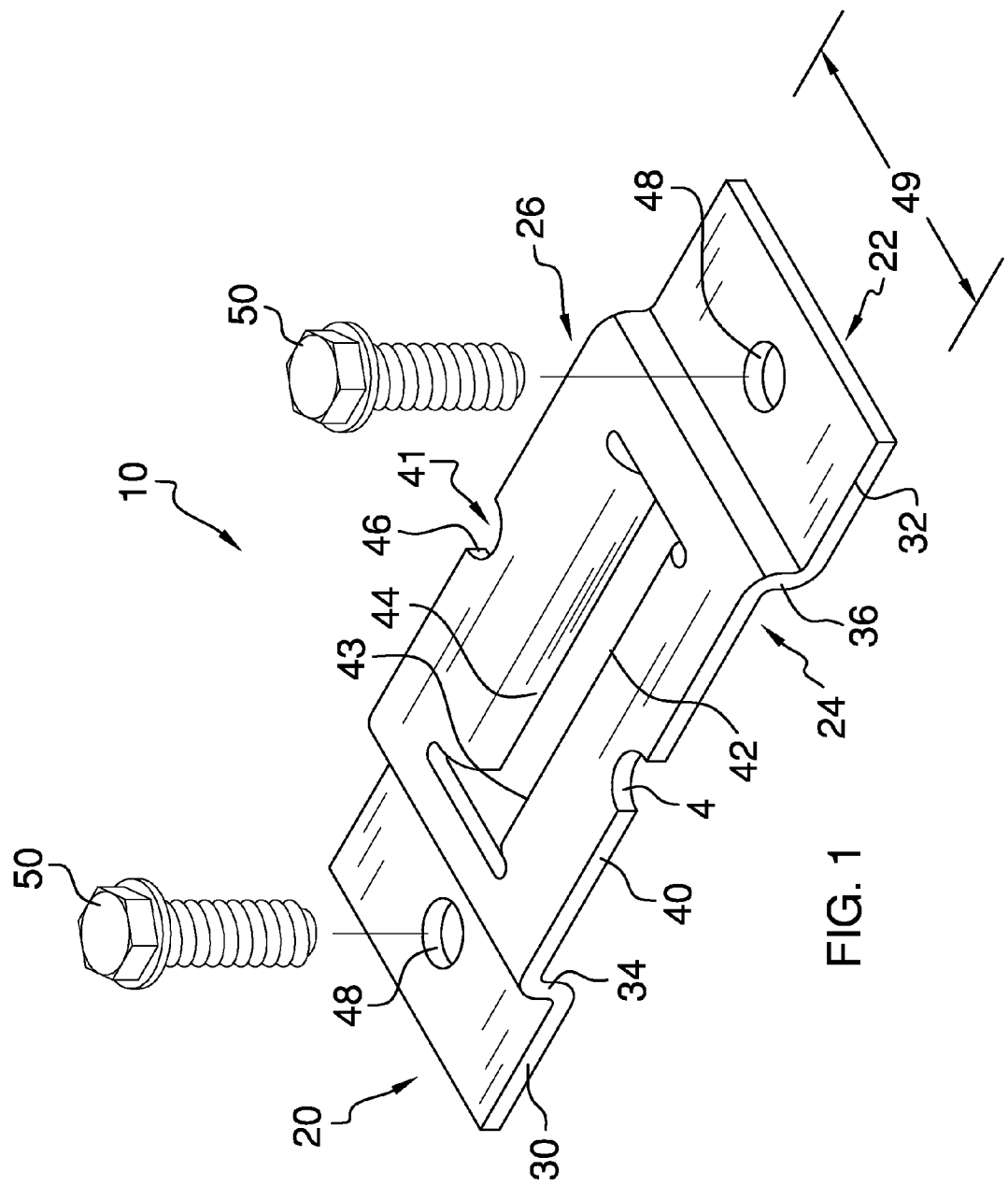
FIG. 1 is a perspective view.
Figure 3:
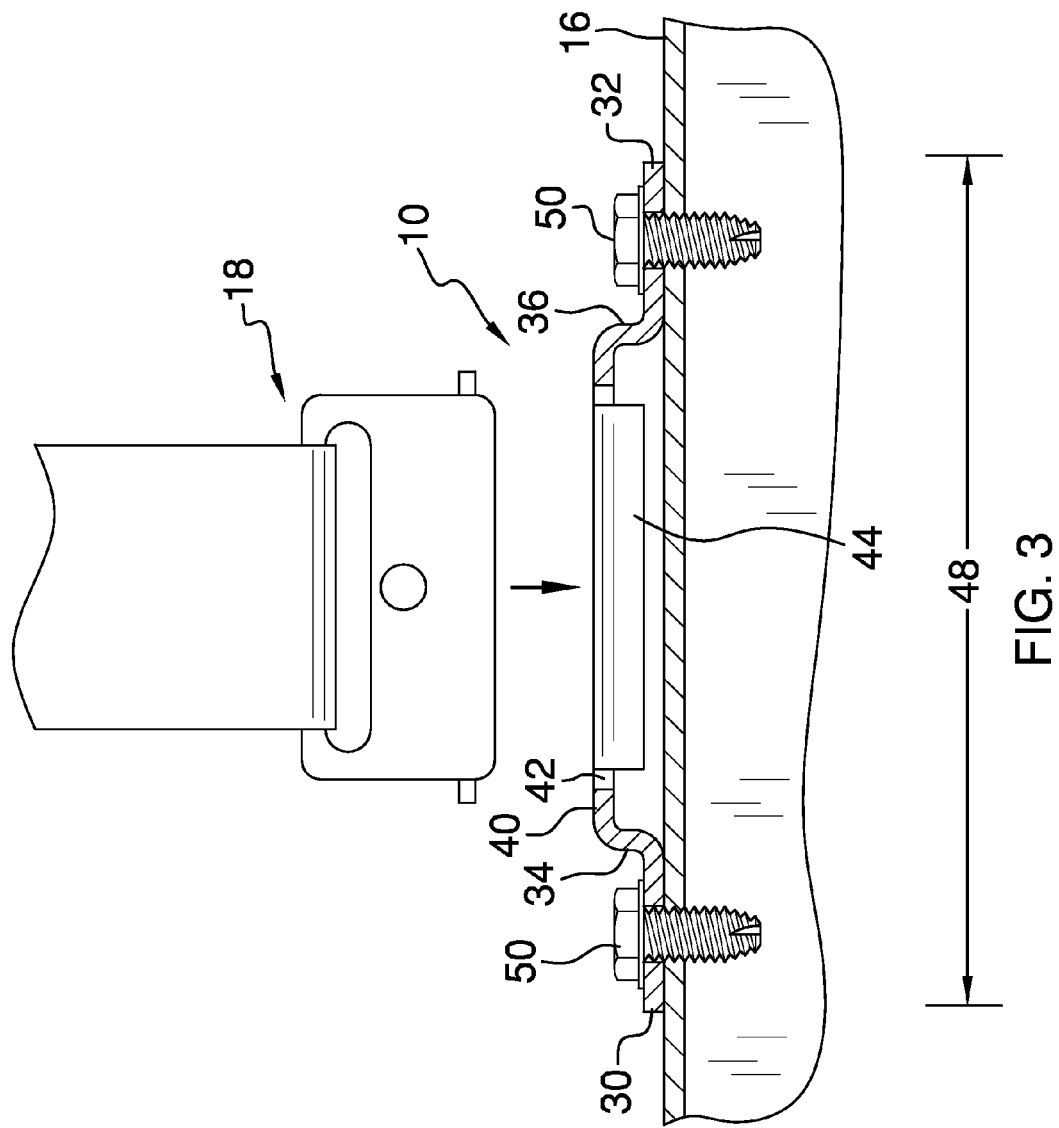
FIG. 3 is a cross sectional view of the apparatus fastened to a surface.

Referring to FIGS. 1 and 3, the apparatus 10 has length 48 of about 5 inches and a width 49 of about 2 inches. The fasteners 50 secure the apparatus 10 to the surface 16.

Figure 2:
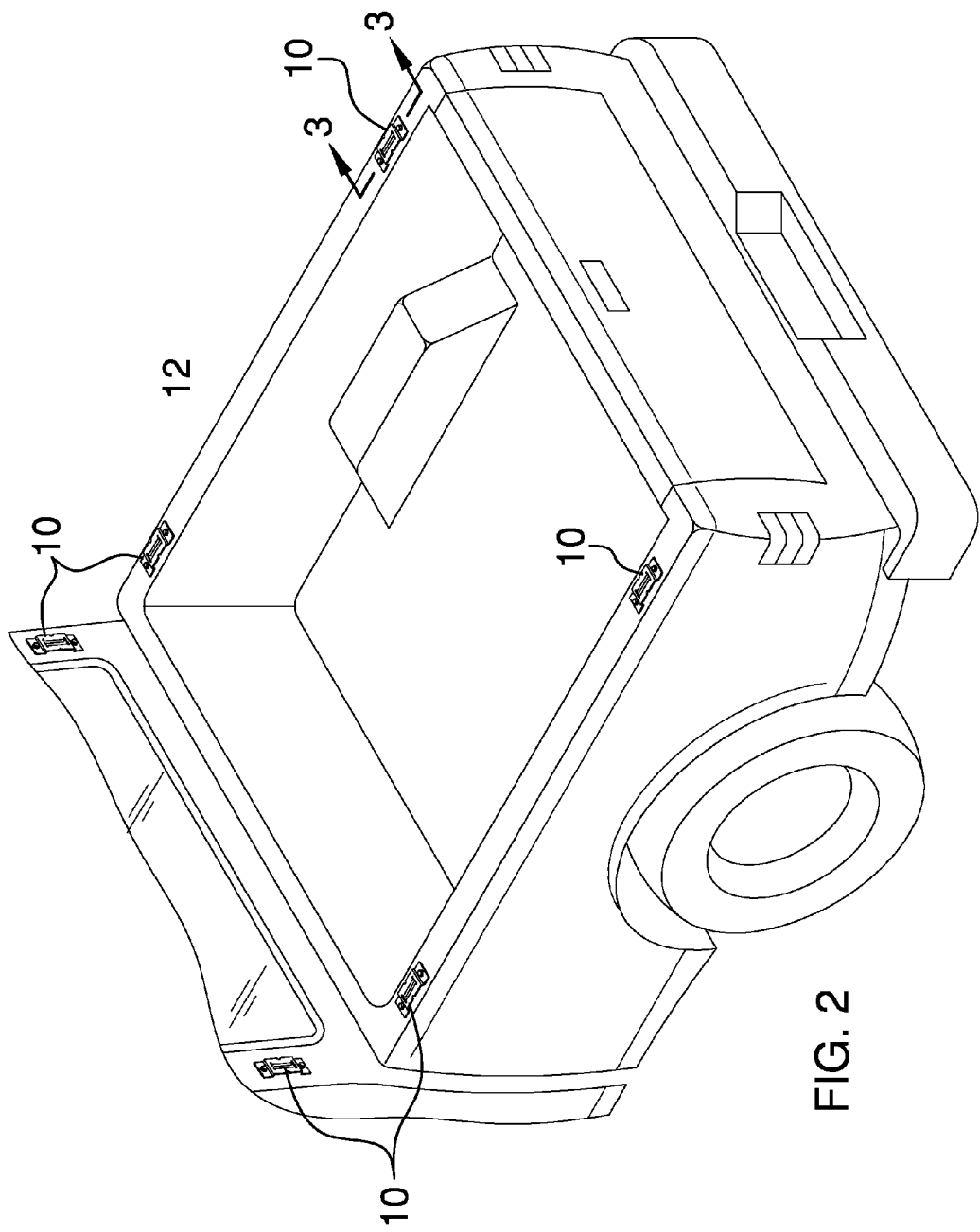
FIG. 2 is a perspective view of a plurality of the apparatus fastened to a pickup bed and cab.

Referring to FIGS. 1 and 2, the apparatus 10 further comprises a first end 20 spaced apart from a second end 22, and a first side 24 spaced apart from a second side 26. The pair of identical rectangular ears comprises the first ear 30 on the first end 20 and the second ear 32 on the second end 22. The mount hole 47 is disposed centrally in each ear. A step is upwardly disposed medially on each ear, comprising the first step 34 extended from the first ear 30 and the second step 36 extended from the second ear 32. The rectangular platform 40 connects the steps. The elongated slot 42 is disposed centrally in the platform 40. The slot 42 is ideally at least 2 inches long. The first downturned extension 43 is disposed longitudinally within the slot 42. The first downturned extension 43 is extended from the platform 40 proximal to the first side 24. The second downturned extension 44 is disposed longitudinally within the slot 42. The second downturned extension 44 is extended from the platform 40 proximal to the second side 26. The first clearance notch 45 is disposed centrally in the platform 40 first side 24. The second clearance notch 46 is disposed centrally in the platform 40 second side 26. The pair of fasteners 50 is removably disposed within the mount holes 47.

Referring to FIG. 2, a plurality of apparatuses is fastened to the pickup bed and to the cab 14.

Figure 4:
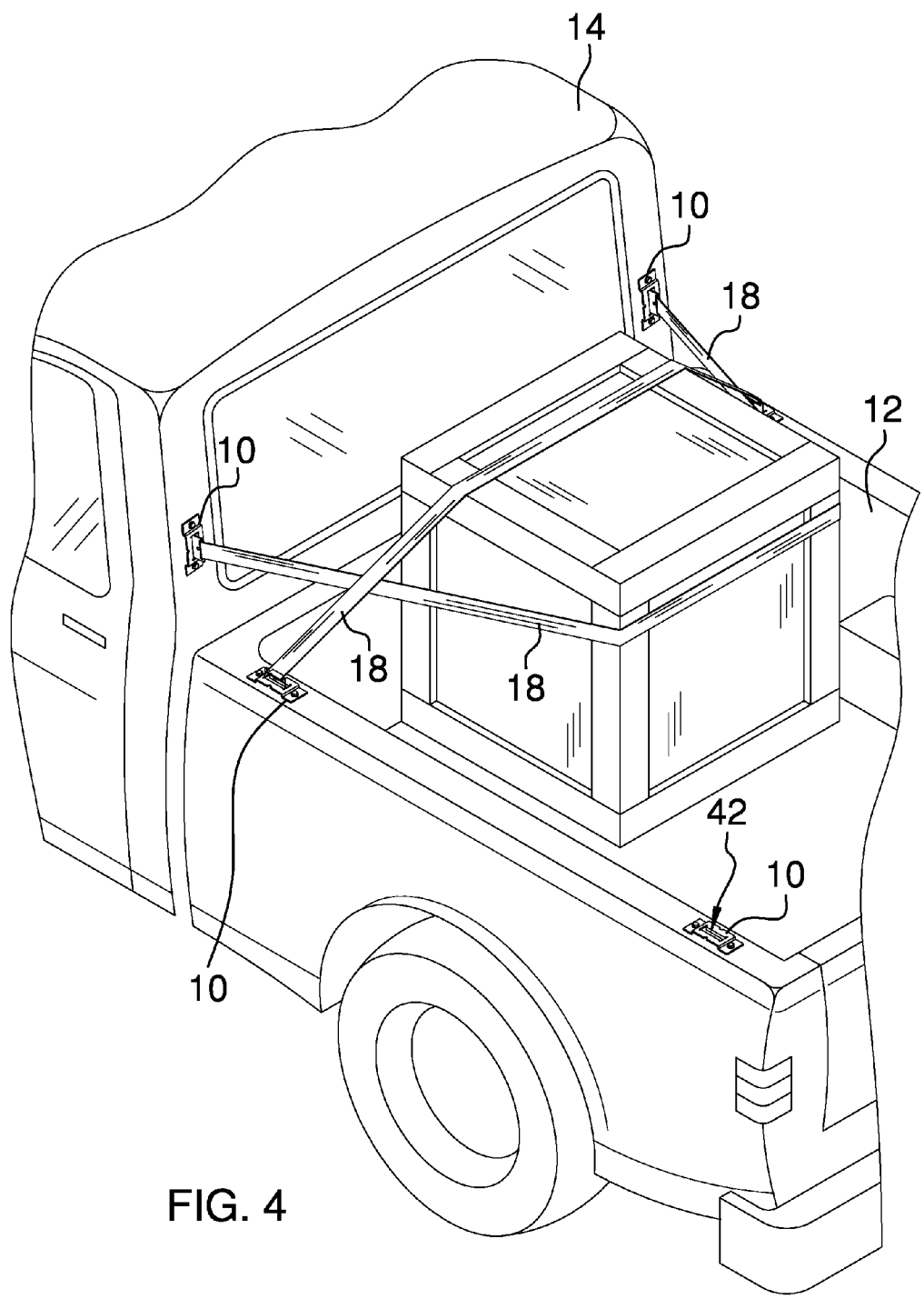
FIG. 4 is a perspective view of a plurality of the apparatus in use.

Referring to FIG. 4, the cargo is held to the pickup bed 12 by the strap assemblies 18 laced through the slots 42 of the apparatuses 10.

With respect to the above description then, it is to be realized that the optimum dimensional relationships for the parts of the tie down bracket apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the tie down bracket apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the tie down bracket apparatus may be used.

Therefore, the foregoing is considered as illustrative only of the principles of the tie down bracket apparatus. Further, since numerous modifications and changes will readily occur to those skilled in the art, it is not desired to limit the tie down bracket apparatus to the exact construction and operation shown and described, and accordingly, all suitable modifications and equivalents may be resorted to, falling within the scope of the tie down bracket apparatus.

What is claimed is:

1. A tie down bracket apparatus, comprising:
   a first end spaced apart from a second end, a first side spaced apart from a second side;
   a pair of identical rectangular ears comprising a first ear on the first end and a second ear on the second end;
   a mount hole disposed centrally in each ear;
   a rectangular platform connected to the ears, the platform elevated above the ears;
   an elongated slot disposed centrally in the platform along a longitudinal midline thereof;
   a first clearance notch disposed centrally in the platform first side;
   a second clearance notch disposed centrally in the platform second side;
   a pair of fasteners removably disposed within the mount holes.

2. A tie down bracket apparatus, comprising:
   a first end spaced apart from a second end, a first side spaced apart from a second side;
   a pair of identical rectangular ears comprising a first ear on the first end and a second ear on the second end;
   a mount hole disposed centrally in each ear;
   a rectangular platform connected to the ears, the platform elevated above the ears;
   an elongated slot disposed centrally in the platform along a longitudinal midline thereof;
   a first downturned extension disposed longitudinally within the slot, the first downturned extension extended from the platform proximal to the first side;
   a second downturned extension disposed longitudinally within the slot, the second downturned extension extended from the platform proximal to the second side;
   a pair of fasteners removably disposed within the mount holes.

3. A tie down bracket apparatus, comprising:
   a length of about 5 inches;
   a width of about 2 inches;
   a first end spaced apart from a second end, a first side spaced apart from a second side;
   a pair of identical rectangular ears comprising a first ear on the first end and a second ear on the second end;
   a mount hole disposed centrally in each ear;
   a step extended upwardly disposed medially on each ear, comprising a first step extended from the first ear, a second step extended from the second ear;
   a rectangular platform connecting the steps;
   an elongated slot disposed centrally in the platform along a longitudinal midline thereof, the slot at least 2 inches long;
   a first downturned extension disposed longitudinally within the slot, the first downturned extension extended from the platform proximal to the first side;
   a second downturned extension disposed longitudinally within the slot, the second downturned extension extended from the platform proximal to the second side;
   a first clearance notch disposed centrally in the platform first side;
   a second clearance notch disposed centrally in the platform second side;
   a pair of fasteners removably disposed within the mount holes.

* * * * *